United States Patent
Choi et al.

(10) Patent No.: US 10,098,096 B2
(45) Date of Patent: *Oct. 9, 2018

(54) CHANNEL STATE INFORMATION REQUEST/FEEDBACK METHOD AND APPARATUS

(71) Applicant: Samsung Electronics Co., Ltd., Gyeonggi-do (KR)

(72) Inventors: Seung Hoon Choi, Gyeonggi-do (KR); Soeng Hun Kim, Gyeonggi-do (KR); Joon Young Cho, Gyeonggi-do (KR); Jin Kyu Han, Seoul (KR); Young Bum Kim, Seoul (KR); Hyoung Ju Ji, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/326,050

(22) Filed: Jul. 8, 2014

(65) Prior Publication Data
US 2014/0321396 A1 Oct. 30, 2014

Related U.S. Application Data

(63) Continuation of application No. 13/083,051, filed on Apr. 8, 2011, now Pat. No. 8,774,027.

(30) Foreign Application Priority Data

Apr. 8, 2010 (KR) .................... 10-2010-0032200
Jun. 18, 2010 (KR) .................... 10-2010-0058154

(51) Int. Cl.
  *H04W 72/04* (2009.01)
  *H04L 5/00* (2006.01)

(52) U.S. Cl.
  CPC ......... *H04W 72/0413* (2013.01); *H04L 5/001* (2013.01); *H04L 5/0053* (2013.01);
  (Continued)

(58) Field of Classification Search
  CPC ... H04L 5/0091; H04L 5/001; H04L 72/0413; H04W 72/0413
  (Continued)

(56) References Cited

U.S. PATENT DOCUMENTS

2005/0254461 A1  11/2005  Shin et al.
2007/0091817 A1   4/2007  Yoon et al.
(Continued)

FOREIGN PATENT DOCUMENTS

CN    101662833    3/2010
CN    102907029    1/2013
(Continued)

OTHER PUBLICATIONS

Huawei, "CQI/PMI/RI Reporting for Carrier Aggregation", R1-101940, 3GPP TSG RAN WG1 Meeting #60bis, Apr. 12-16, 2010.*
(Continued)

*Primary Examiner* — Mewale Ambaye
(74) *Attorney, Agent, or Firm* — The Farrell Law Firm, P.C.

(57) ABSTRACT

Methods and apparatuses are provided for Channel State Information (CSI) feedback. An Uplink (UL) grant is received from a Node B. Information included in the UL grant is identified. If the information is mapped to at least one DownLink (DL) Component Carrier (CC) based on configuration information relating to at least one set including the at least one DL CC, at least one CSI corresponding to the at least one DL CC is generated. The generated at least one CSI is transmitted to the Node B.

16 Claims, 15 Drawing Sheets

(52) U.S. Cl.
CPC .......... *H04L 5/0055* (2013.01); *H04L 5/0057* (2013.01); *H04L 5/0091* (2013.01); *H04L 5/0094* (2013.01)

(58) Field of Classification Search
USPC ........................................................ 370/325
See application file for complete search history.

(56) References Cited

U.S. PATENT DOCUMENTS

| | | | |
|---|---|---|---|
| 2007/0129018 A1 | 6/2007 | Trainin et al. | |
| 2007/0293233 A1 | 12/2007 | Inoue et al. | |
| 2008/0095185 A1* | 4/2008 | DiGirolamo | H04L 1/0026 370/464 |
| 2009/0196232 A1 | 8/2009 | Maltsev et al. | |
| 2009/0274086 A1 | 11/2009 | Petrovic et al. | |
| 2010/0035625 A1* | 2/2010 | Damnjanovic | H04W 72/00 455/450 |
| 2011/0034192 A1 | 2/2011 | Lim et al. | |
| 2011/0141941 A1* | 6/2011 | Lee, II | H04L 1/0038 370/252 |
| 2011/0165846 A1 | 7/2011 | Zheng et al. | |
| 2011/0205978 A1 | 8/2011 | Nory et al. | |
| 2011/0242982 A1 | 10/2011 | Lunttila et al. | |
| 2011/0299626 A1 | 12/2011 | Kim et al. | |
| 2012/0063349 A1* | 3/2012 | Kim | H04L 5/0007 370/252 |
| 2012/0294272 A1* | 11/2012 | Han | H04L 1/0027 370/329 |
| 2013/0058240 A1* | 3/2013 | Kim | H04L 5/0007 370/252 |
| 2013/0089043 A1 | 4/2013 | Lunttila et al. | |

FOREIGN PATENT DOCUMENTS

| | | |
|---|---|---|
| EP | 1909518 | 8/2005 |
| EP | 2 453 598 | * 7/2010 |
| KR | 10-0754722 | 8/2007 |
| KR | 1020090103661 | 10/2009 |
| RU | 2369012 | 9/2009 |
| TW | 200723739 | 6/2007 |
| WO | WO 2007/112371 | 10/2007 |
| WO | WO 2008/051466 | * 2/2008 |
| WO | WO2011/116823 | * 3/2010 |
| WO | WO-2011-116823 | * 9/2011 |

OTHER PUBLICATIONS

3GPP TSG RAN WG1 Meeting #54bis, "InterDigital for collisions between periodic and aperiodic CQI/PMI/RI reports and draft CR to 36.213, filed on Sep. 29-Oct. 3, 2008".*

Ericsson, "Summary from Email Discussion on CIF", R1-101661, 3GPP TSG RAN WG1 Meeting #60, Feb. 22-26, 2010.

3rd Generation Partnership Project; Technical Specification Group Radio Access Network; Evolved Universal Terrestrial Radio Access (E-UTRA).

Physical Layer Procedures (Release 9), 3GPP TS 36.213 V9.1.0, Mar. 2010.

European Search Report dated Nov. 20, 2014 issued in counterpart application No. 11161148.9-1851.

Qualcomm Incorporated, "CQI Feedback for Multicarrier Operation", R1-101478, 3GPP TSG RAN WG1 #60, Feb. 22-26, 2010.

Panasonic, HTC Corporation, "Aperiodic CQI Reporting for Carrier Aggregation", R1-100372, 3GPP TSG-RAN WG1 Meeting 59bis, Jan. 18-22, 2010.

Samsung, "Aperiodic CQI Activation in CA", R1-102186, 3GPP TSG RAN WG1 #60bis, Apr. 12-16, 2010.

Samsung, "Issues on Linking in REL-10", Tdoc R2-102447, 3GPP TSG-RAN2#69bis meeting, Apr. 12-16, 2010.

Samsung, "Linking of DL PCC and UL PCC", R2-102303, 3GPP TSG RAN WG2#69bis, Apr. 12-16, 2010.

Samsung, "Aperiodic CQI Reporting for CA", R1-104591, 3GPP TSG RAN WG1 #62, Aug. 23-28, 2010.

Samsung, "Aperiodic CQI Activation in Carrier Aggregation", R1-105373, 3GPP TSG RAN WG1 #62b, Oct. 11-15, 2010.

Samsung, "Aperiodic CSI Triggering in Carrier Aggregation", R1-106028, 3GPP TSG RAN WG1 #63, Nov. 15-19, 2010.

Panasonic, HTC, "Aperiodic CQI Reporting for Carrier Aggregation", R1-101262, 3GPP TSG-RAN WG1 Meeting 60, Feb. 22-26, 2010, 2 pages.

Australian Examination Report dated Jul. 21, 2015 issued in counterpart application No. 2011239115, 3 pages.

Russian Office Action dated Jul. 28, 2015 issued in counterpart application No. 2012127376/07, 18 pages.

Qualcomm Incorporated, "Cross-Carrier PC with DCI Format 3/3A", R1-102326, 3GPP TSG RAN WG1 #60bis, Apr. 12-16, 2010.

Nokia et al., "Cross-CC Scheduling with DCI Format 3/3A in LTE-Advanced", R1-101422, 3GPP TSG RAN WG1 Meeting #60, Feb. 22-26, 2010.

Russian Office Action dated Mar. 16, 2015 issued in counterpart application No. 2012127376/07.

Japanese Decision of Rejection dated Feb. 16, 2015 issued in counterpart application No. 2013-503666.

Nikia Siemens Networks et al., "Remaining Details of Carrier Indicator Field", R1-100316, 3GPP TSG RAN WG1 #59bis Meeting, Jan. 18-22, 2010, 3 pages.

Motorola, "Further Details on CIF Design", R1-101108, 3GPP TSG RAN WG1 Meeting #60, Feb. 22-26, 2010, 3 pages.

Catt, "DCI Formats with CI and Interpretation of CIF", R1-100069, 3GPP TSG RAN WG1 Meeting #59bis, Jan. 18-22, 2010, 3 pages.

Australian Examination Report dated Nov. 19, 2015 issued in counterpart application No. 2011239115, 4 pages.

Indian Office Action dated Aug. 13, 2018 issued in counterpart application No. 1372/KOLNP/2012, 6 pages.

* cited by examiner

CHANNEL STATE INFORMATION REQUEST/FEEDBACK METHOD AND APPARATUS

PRIORITY

This application is a Continuation Application of U.S. patent application Ser. No. 13/083,051, filed on Apr. 8, 2011, now U.S. Pat. No. 8,774,027, issued on Jul. 8, 2014, which claims priority under 35 U.S.C. § 119(a) to an applications filed in the Korean Intellectual Property Office on Apr. 8, 2010 and Jun. 18, 2010, and assigned Serial Nos. 10-2010-0032200 and 10-2010-0058154, respectively, the contents of which are incorporated herein by reference.

BACKGROUND OF THE INVENTION

1. Field of the Invention

The present invention relates generally to wireless communications, and more particularly, to a channel state information request/feedback method and apparatus for a wireless communication system supporting carrier aggregation or bandwidth extension.

2. Description of the Related Art

Long Term Evolution-Advanced (LTE-A) is standardized by the $3^{rd}$ Generation Partnership Project (3GPP). In the 3GPP, a Bandwidth Extension technique is discussed to support a peak data rate that is comparatively higher than the LTE Release 8.

The Bandwidth Extension, based on the Carrier Aggregation technique, can extend the bandwidth beyond a single LTE Release 8 system bandwidth. In the Bandwidth Extension, each bandwidth for transmission is called a Component Carrier (CC).

A Release 8 LTE User Equipment (UE) is specified to use a single Component Carrier in UpLink (UL) and DownLink (DL), respectively.

The Component Carriers (CCs) can be aggregated contiguously or non-contiguously in a frequency domain.

FIG. 1 is a diagram illustrating a relationship of a DL CC 100 and a UL CC 101 in the LTE Release 8 system.

In LTE Release 8, each UE performs communication with the single DL CC 100 and the single UL CC 101. The UL grant and DL assignment are transmitted on the DL CC 100, and the PUSCH corresponding to the UL grant is transmitted on the UL CC 101 associated with the DL CC 100. In FIG. 1, the solid line connecting the DL CC 100 and the UL CC 101 shows the relationship between the DL CC 100 and the UL CC 101 on which the PUSCH transmission is scheduled by means of the UL grant transmitted on the DL CC 100.

When data to be transmitted occurs, the LTE Release 8 UE receives scheduling information for transmitting a Physical Uplink Shared Channel (PUSCH) in a Physical Downlink Control Channel (PDCCH) transmitted by a base station (eNodeB or eNB). The scheduling information can be called an UL grant. In LTE Release 8, only one Downlink Control Information (DCI) format, i.e. DCI format 0, is defined for the UL grant. In order to check the channel state of the downlink carrier on which the PDCCH is transmitted, the eNB requests the UE for aperiodic Channel State Information (CSI) with a 1-bit CSI request field of DCI format 0. When the signal of DCI format 0 is received, the UE analyzes the CSI request field contained in the received signal, measures channel state in the subframe in which the signal is received, and feeds back the measured aperiodic CSI of the DL CC 100 to the eNB. The aperiodic CSI is multiplexed with the data to be transmitted by the UE on the PUSCH. Although the aperiodic CSI is multiplexed with the data to be transmitted by the UE on the PUSCH, it is simply referred to as "transmits aperiodic CSI" herein.

In LTE-A, a UE can communicate multiple downlink Carrier Components and/or multiple uplink Carrier Components with the bandwidth extension technique. When using carrier aggregation, however, the conventional method has is problematic when the eNB requests the aperiodic CSI and the UE feeds back the requested aperiodic CSI.

SUMMARY OF THE INVENTION

The present invention has been made to address at least the above problems and/or disadvantages and to provide at least the advantages described below. Accordingly, an aspect of the present invention provides a channel state information request/feedback method and apparatus for a wireless communication supporting bandwidth extension technique that enables an eNB requests for aperiodic channel state information of a downlink component carrier and enables a UE to measure and feed back the channel state of the downlink component carrier.

According to one aspect of the present invention, a CSI feedback method of a terminal is provided. A UL grant is received from a Node B. Information included in the UL grant is identified. If the information is mapped to at least one DL CC based on configuration information relating to at least one set including the at least one DL CC, at least one CSI corresponding to the at least one DL CC is generated. The generated at least one CSI is transmitted to the Node B.

According to another aspect of the present invention, a terminal is provided for feeding back CSI to a base station. The terminal includes a receiver configured to receive, from a Node B, an UL grant. The terminal also includes a controller configured to identify information included in the UL grant and generate, if the information is mapped to at least one DL CC based on configuration information relating to at least one set including the at least one DL CC, at least one CSI corresponding to the at least one DL CC. The terminal further includes a transmitter configured to transmit, to the Node B, the generated at least one CSI.

According to an additional aspect of the present invention, a method of a Node B for requesting CSI feedback from a terminal is provided. An UL grant is configured including information that indicates, when the information indicates a CSI request, at least one DL CC mapped to the information, based on configuration information relating to at least one set including the at least one DL CC. The configured UL grant is transmitted to the terminal. A CSI of the at least one DL CC mapped to the information is received from the terminal.

According to a further aspect of the present invention, a Node B is provided for requesting CSI feedback from a terminal. The Node B includes a scheduler configured to configure a UL grant including information that indicates, when the information indicates a CSI request, at least one DL CC mapped to the information, based on configuration information relating to at least one set including the at least one DL CC. The Node B also includes a transmitter configured to transmit, to a terminal, the configured UL grant. The Node B further includes a receiver configured to receive, from the terminal, a CSI of the at least one DL CC mapped to the information.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
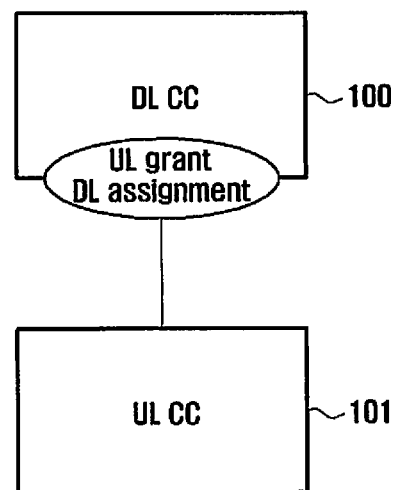
FIG. 1 is a diagram illustrating a relationship of the DL CC 100 and the UL CC 101 in the LTE Release 8 system.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The dimensions of certain elements can be exaggerated or not in true proportion. Also, the size of each element may not reflect the true size.

A description is provided of the mobile terminal, according to embodiments of the present invention.

The description is made with terms related to carrier aggregation technology that are defined as following:

Backward compatible carrier: a carrier that the LTE UE also can access

Non-backward compatible carrier: a carrier that only the LTE-A UE can access

DL CC set: a set of downlink CCs

UL CC set: a set of uplink CCs

Carrier Indicator Field (CIF): a field indicating that, when it is difficult to transmit the PDCCH on a certain component carrier, the PDCCH is transmitted on another PDCCH and the PDCCH indicates the PDSCH or PUSCH on another component carrier. Three bits are added to the Downlink Control Information (DCI) format so as to indicate another component carrier. The CIF is included in the DCI format only in cases of cross carrier scheduling. The DL CC is associated with a UL CC and the connection relationship is transmitted by Radio Resource Control (RRC) signaling. When the CIF is included in DL assignment, the CIF indicates the DL CC on which the PDSCH, scheduled by the DL assignment, is transmitted. When the CIF is included in the UL grant, the CIF indicates the UL CC on which the PUSCH, scheduled by the UL grant, is transmitted.

In the following description, the DL CC is used to denote the carrier for transmitting control signal and/or data in DL. Also, the term UL CC is used to denote the carrier for transmitting control information and/or data in UL.

In addition to the aforementioned terms, the terms "DL anchor CC," "DL Primary Component Carrier (PCC)," "UL anchor CC," and "UL PPC" are also utilized herein. In embodiments of the present invention, the description is provided with the terms "DL anchor CC" and "UL anchor CC." The DL anchor CC and UL anchor CC can be defined in view of the UE, and these CCs can be used for transmitting certain system information and control information.

The DL CCs and UL CCs are linked. When the DCI format contains CIF, one DL CC can be linked to multiple UL CCs or multiple DL CCs can be linked to one UL CC. The CIF can indicate the UL CC transmitting PUSCH. When the DCI format has no CIF, one DL CC should be linked to one UL CC.

The DL CC set is a set of downlink CCs defined by a cell. The DL CCs assigned to the UE are defined as some or all of the carriers included in the DL CC set by RRC signaling. The different DL CCs can be assigned depending on the UE.

Assuming that DL CC set={1, 2, 3, 4, 5} and each element of the DL CC set indicates a CC having a bandwidth of 20 MHz, the maximum number of carriers that can be assigned by a cell among the carriers contained in the DL CC set is configured according to the device capability of the UE. For example, the network can assign DL CCs 1, 3, and 4, of which DL CC 3 is assigned as the DL anchor CC. Although it is assumed that the all of the CCs in the DL CC set have the same bandwidth in the above example, embodiments of the present invention can be applied to the case where the CCs have different bandwidths.

Figure 2:
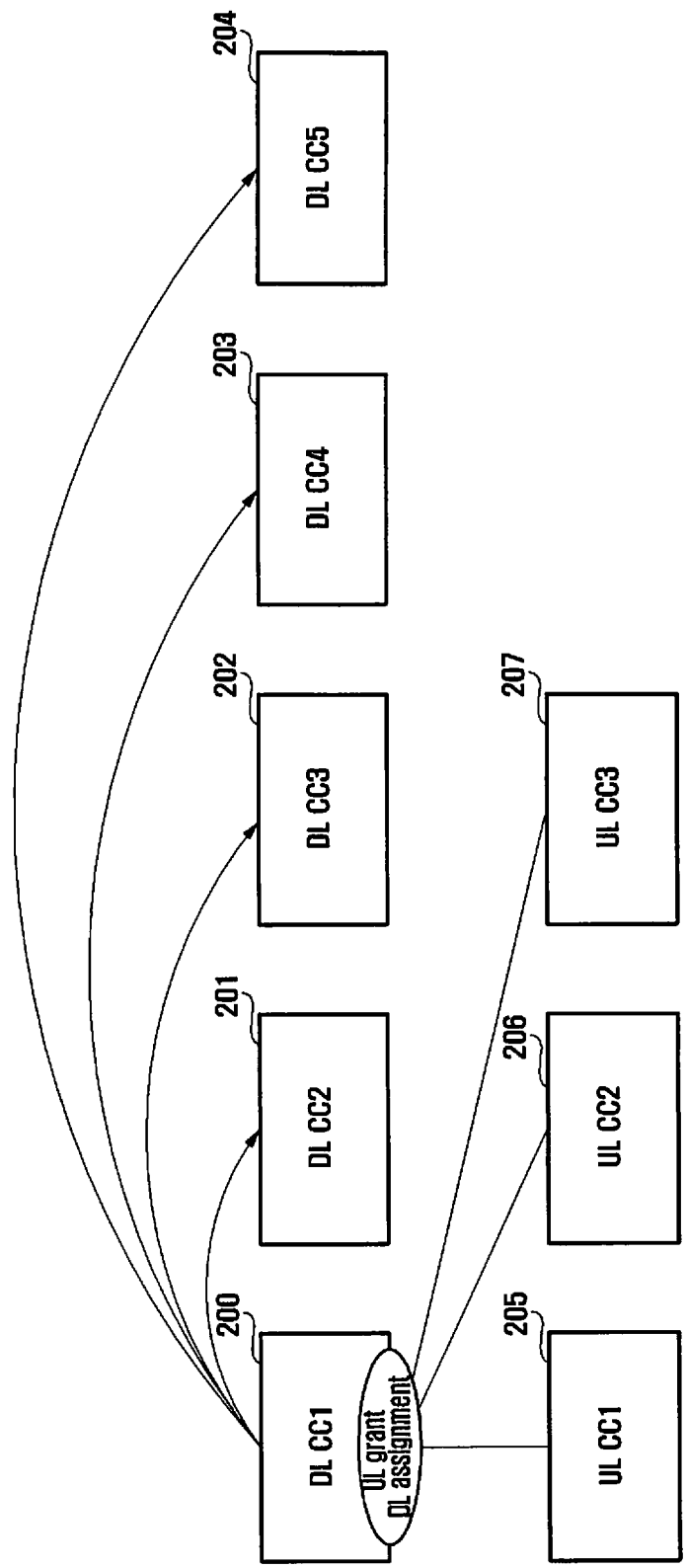
FIG. 2 is a diagram illustrating a linkage relationship between DL CCs and UL CCs in the CSI request/feedback method, according to a first embodiment of the present invention.

FIG. 2 is a diagram illustrating a linkage relationship between DL CCs 200, 201, 202, 203, and 204 and UL CCs 205, 206, and 207 in the CSI request/feedback method, according to the first embodiment of the present invention.

In the first embodiment of the present invention, cross carrier scheduling is supported. This means that the UL grant or the DL assignment includes CIF.

Referring to FIG. 2, DL CC1 200 is linked to UL CC1 205, UL CC2 206, and UL CC3 207, and the linkages are depicted by solid lines as shown in FIG. 2. On the DL CC1

200, both the UL grant and DL assignment can be transmitted. DL CC2 201, DL CC3 202, DL CC4 203, and DL CC5 204 are not linked with any of the UL CCs, and no UL grant or DL assignment is transmitted on these DL CCs. Specifically, the DL CCs 201, 202, 203, and 204 are used for the PDSCH, i.e., DL data transmission. The UL control information about the DL CCs 201, 202, 203, and 204, i.e., ACK/NACK, can be transmitted on the UL anchor CC defined by means of the RRC signaling. An embodiment of the present invention relates to a procedure in which the eNB requests the UE for aperiodic channel state information about one of the DL CCs 201, 202, 203, and 204 and the UE measures and feeds back the channel state information on the UL CC under the assumption of the linkages between the DL CCs and UL CCs, as shown in FIG. 2.

Figure 3:
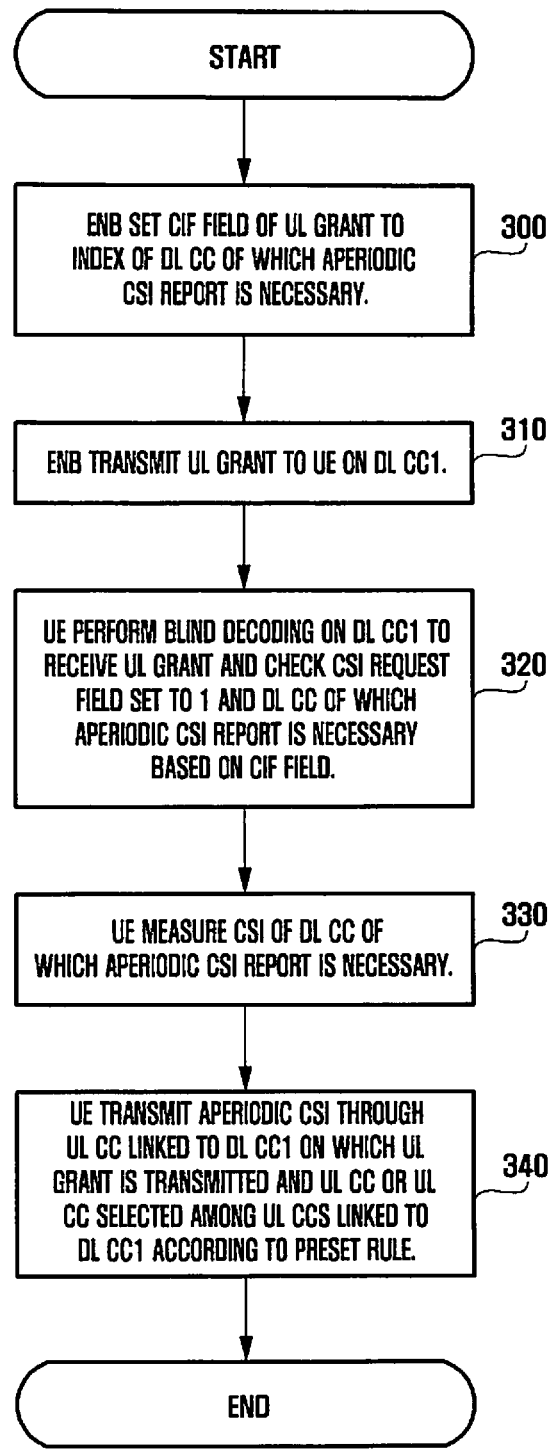
FIG. 3 is a flowchart illustrating an aperiodic CSI request/feedback method between an eNB and a UE, according to the first embodiment of the present invention.

FIG. 3 is a flowchart illustrating an aperiodic CSI request/feedback method between an eNB and a UE, according to the first embodiment of the present invention.

In the aperiodic CSI request/feedback method, according to the first embodiment of the present invention, if the CSI request field is set to 1, the CIF included in the UL grant indicates the DL CC for which the aperiodic channel state information is required rather than the UL CC for PUSCH transmission. The CSI request procedure is described in detail with reference to FIG. 3.

The eNB sets the CIF field to the index number of the DL CC of which aperiodic CSI is necessary and the CSI request field of UL grant to 1 in step 300. The CIF is set to 2 for the aperiodic CSI of the DL CC2 201. The CIF is set to 3 for the aperiodic CSI of the DL CC3 202. The CIF is set to 4 for the aperiodic CSI of DL CC4 203. The CIF is set to 5 for the aperiodic CSI of DL CC5 204. The CIF is set under the rule specified between the eNB and the UE.

The CSI request filed is used for identifying that the UL grant having the CSI request field is the UL grant having request for CSI. If the CSI request field is set to 1, this means that the UL grant is the signal requesting for the CSI. Although it can be assumed that the CSI request field is set to 0 for the CSI request of the UL grant, the CSI request field is set to 1 for indicating the UL grant requesting for CSI in embodiments of the present invention. Since it is enough to carry the information with its value of 0 or 1, the CSI request field is assigned one bit. Nevertheless, more bits can be assigned for the CSI request field, according to an embodiment of the present invention, and in this case, the CSI request field can be set to a value other than 0 and 1 for indicating the UL grant requesting CSI.

In the following description, the expression "set the CSI request field to a request value" means that the CSI request field is set to a value indicating the UL grant having request for CSI. In the following description, the expression "the value of the CSI request field is the request value" means that the CSI request field is set to a value indicating the UL grant having request for CSI. In the following, if the request value is 1, i.e. the CSI request field is set to 1, this indicates the UL grant having a request for CSI.

According to another embodiment of the present invention, the field for indicating the DL CC, i.e. CIF assigned 3 bits for indicating the DL CC according to the first method using a predefined rule, can discriminate among eight states such that, when there are 5 DL CCs as shown in FIG. 2, five states can be used for indicating individual DL CCs, and one state for instructing feedback of CSIs of all the DL CCs. If the field defined for indicating the DL CC indicates a plurality of DL CCs, this means that the eNB requests for the aperiodic CSIs of the plural DL CCs.

According to the second method using a predefined rule for setting the CIF indicating the DL CC, the field for indicating the DL CC, i.e. CIF assigned 3 bits for indicating the DL CC, can discriminate among eight states such that three states can be used for indicating individual DL CCs, other three states for indicating three possible pairs among the DL CCs, and one state for indicating all of the three DL CCs. For example, each bit for indicating each DL CC can be assigned to indicate whether the CSI of a certain DL CC is requested.

The predefined rule can be informed by RRC signaling or another method.

Referring again to FIG. 3, after setting the CIF, the eNB transmits the UL grant to the UE on the DL CC1 200, in step 310. At step 310, the eNB selects the DL CC supporting transmission of UL grant and DL assignment and linked to the UL CCs. Since the CIF is used in order to indicate the DL CC of which aperiodic CSI is necessary, the DL CC on which the UL grant having the CIF is selected according the aforementioned conditions.

The UE performs decoding on the DL CC1 200 to receive the UL grant and checks that the CSI request field of the received UL grant is set to 1, in step 320. The UE also checks the CIF of the received UL grant to identify the DL CC of which aperiodic CSI is requested.

Next, the UE measures the channel state of the DL CC of which aperiodic channel state information is requested, in step 330. the CSI measurement on the DL CC can include extracting the information for feedback of the CSI from the information on the previously measured or saved CSI. This can be applied in other embodiments of the present invention.

After the measurement of the channel state, the UE feeds back the aperiodic CSI on the UL CC linked with the DL CC1 200 on which the UL grant has been transmitted or the UL CC selected according to a predefined rule among UL CCs linked to the DL CC1 200, in step 340.

The predefined rule can be as follows: if the DL CC1 200 is linked to multiple UL CCs having different bandwidths, the UE can determine the UL CC for the transmission of the aperiodic CSI based on the length of the UL grant. If the DL CC1 200 is linked with multiple UL CCs having the same bandwidth, the UE can determine the UL CC for the transmission of the aperiodic CSI by means of RRC signaling or other method. The other method is to transmit the aperiodic CSI on the UL anchor CC when the DL CC1 200 is linked to multiple UL CCs.

When the eNB requests for the aperiodic CSI about more than two DL CCs, it can be considered to perform joint coding on the CSI about more than two DL CCs, rather than encode the aperiodic CSIs of DL CCs individually in another embodiment of the present invention. When the aperiodic CSIs of more than two DL CCs are greater than 11 bits, Tail Biting Convolutional Code (TBCC) or Turbo Code can be used. When the aperiodic CSIs of the DL CCs are less than or equal to the 11 bits, (32, x) block code can be used, where x means information size.

Although the description of the first embodiment of the present invention is directed to the case where the DL CC of which aperiodic CSI is requested is in an activated state, this method can be applied for requesting aperiodic CSI of the DL CC in a deactivated state. When there is a deactivated DL CC among the DL CCs 201, 202, 203, and 204 depicted in FIG. 2, the eNB can request for the aperiodic CSI of the deactivated DL CC such that the UE feeds back the aperiodic CSI of the deactivated DL CC, according to the procedure described with reference to FIG. 3. In this case, however, the Radio Frequency (RF) of the deactivated DL CC can be turned on or off according to whether the deactivated DL CC is contiguous in a frequency domain. Accordingly, the aforementioned process is not required when the RF of the deactivated DL CC is turned on, at step 330. However, if the RF of the deactivated DL CC is turned off, it is required to turn on the RF first to measure the CSI the deactivated DL CC.

Figure 4:
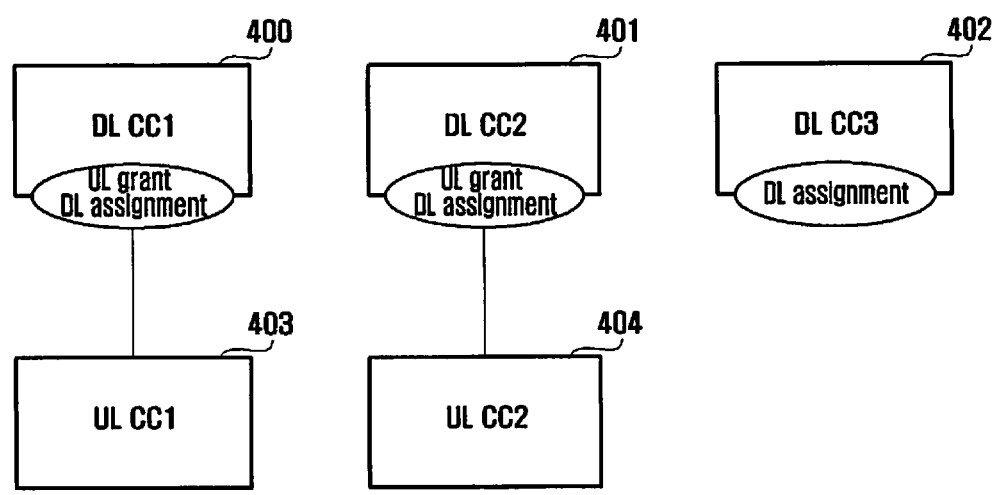
FIG. 4 is a diagram illustrating a linkage relationship between DL CCs and UL CCs in the CSI request/feedback method, according to a second embodiment of the present invention.

FIG. 4 is a diagram illustrating a linkage relationship between DL CCs 400, 401, and 402 and UL CCs 403 and 404 in the CSI request/feedback method, according to the second embodiment of the present invention.

In the second embodiment of the present invention, the cross carrier scheduling is not supported. This means that the UL grant and DL assignment include no CIF. Referring to FIG. 4, DL CC1 400 is linked to UL CC1 403, and DL CC2 401 is linked to UL CC2 404. The linkage relationship is expressed by solid lines as shown in FIG. 4. Both the UL grant and DL assignment can be transmitted on the DL CC1 400 and DL CC2 401. The DL CC3 402 is not linked to any UL CC, only the DL assignment can be transmitted on the DL CC3 402. The UL control information about the DL CC3 402, i.e. ACK/NACK, can be transmitted on the UL anchor CC defined by RRC signaling. The linkage relationship depicted in FIG. 4 is a carrier arrangement appropriate for the case where there is large amount of data to be transmitted on the DL CC.

Figure 5:
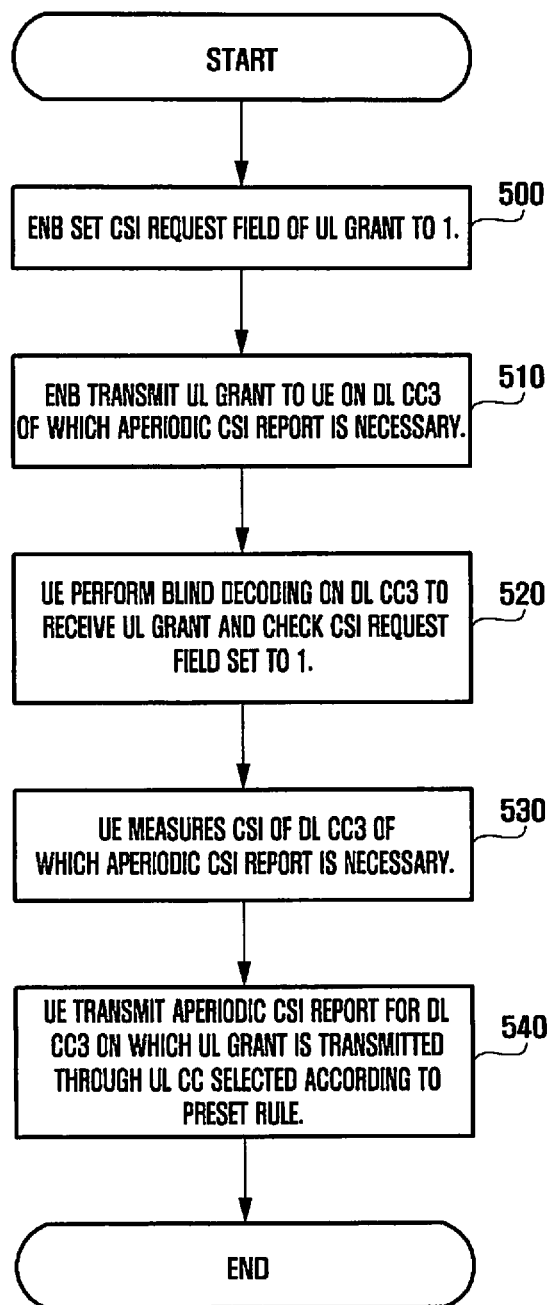
FIG. 5 is a flowchart illustrating an aperiodic CSI request/feedback method between an eNB and a UE, according to the second embodiment of the present invention.

FIG. 5 is a flowchart illustrating an aperiodic CSI request/feedback method between an eNB and a UE, according to the second embodiment of the present invention.

In the aperiodic CSI request/feedback method, according to the second embodiment of the present invention, the eNB transmits the UL grant on the DL CC of which aperiodic CSI is necessary and on which actual the UL grant transmission is not allowed, and the UE checks whether the CSI request in the received signal is set to 1. If it is set to 1, the UE determines that the signal is transmitted to request for the aperiodic CSI of the DL CC on which the signal is received rather than that the signal is mis-received.

In the current LTE specification, the DCI format 0 for UL grant and the DCI format 1A for DL assignment are the same length (payload size) and thus, a 1-bit flag is used to differentiate between the two formats. Accordingly, the blind decoding on the signal received through the DL CC, which is not allowed for UL grant transmission, can be performed at the UE without any problem.

The eNB first sets the CSI request field of the UL grant to 1, in step 500. Next, the eNB transmits the UL grant to the UE through DL CC 3 402 of which aperiodic CSI is necessary, in step 510. Meanwhile, the UE performs blind decoding on the DL CC2 402 to receive the UL grant, checks that the CSI request field of the UL grant is set to 1, and recognizes that the UL grant is transmitted to request of the aperiodic channel state information of the DL CC3 402, rather than that it is mis-received, in step 520. The UE measures the channel state of the DL CC3 402 of which aperiodic CSI is necessary, in step 530. Finally, the UE transmits the aperiodic CSI of the DL CC3 402, on which the UL grant is received, on the UL CC selected according to a predefined rule, in step 540. Here, the predefined rule can be as follows: the UL CC for aperiodic CSI transmission can be determined by RRC signaling or another method, or the UL anchor CC can be selected for the aperiodic CSI transmission.

Figure 6:
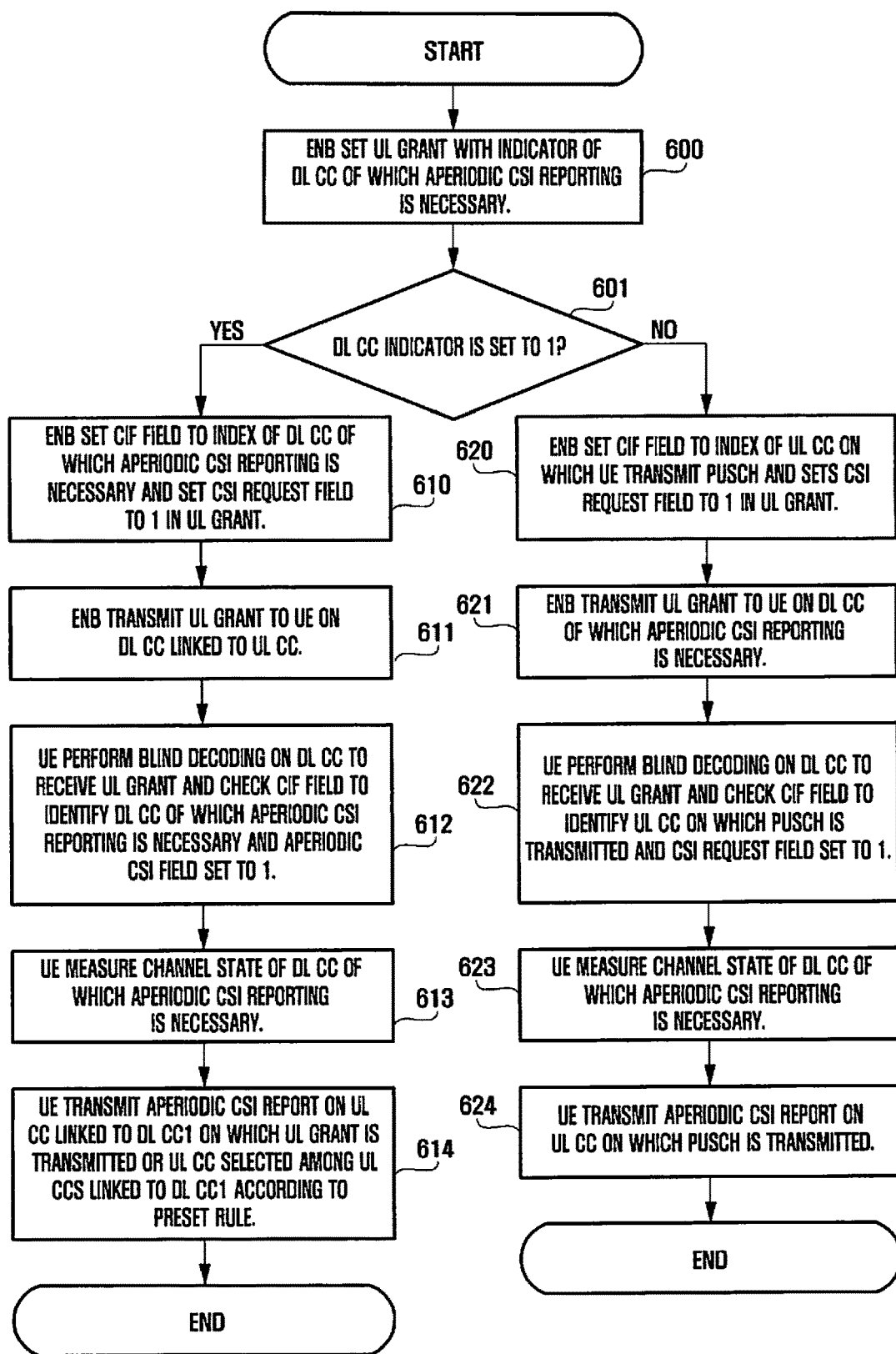
FIG. 6 is a flowchart illustrating an aperiodic CSI request/feedback method, according to a third embodiment of the present invention.

FIG. 6 is a flowchart illustrating an aperiodic CSI request/feedback method, according to the third embodiment of the present invention.

In the third embodiment of the present invention, the description is made with reference to the linkage relationship between the DL CCs and UL CCs as depicted in FIG. 2. As in the first embodiment, the cross carrier scheduling is supported in the third embodiment, and the UL grant and DL assignment include a CIF.

In the aperiodic CSI request/feedback method according to the third embodiment, a DL CC indicator or a UL CC indicator is added to the UL grant for expressing whether the CIF of the UL grant is indicating a DL CC or a UL CC. The DL CC indicator or UL CC indicator can be assigned 1 bit. In the following, the description is made under the assumption that 1-bit DL CC indicator is added to the UL grant. Although the name differs from the DL CC indicator, the UL CC indicator is basically identical with the DL CC indicator in that it is used to indicate whether the CIF of the UL grant indicates a DL CC or a UL CC.

The eNB first sets the DL CC indicator for reporting aperiodic CSI in the UL grant, in step 600. The DL CC indicator is set to 1 for the CIF indicating a DL CC, and set to 0 for the CIF indicating a UL CC. There can be an embodiment in which the DL CC indicator is set to 0 for the CIF indicating a DL CC, and set to 1 for the CIF indicating a UL CC. When the UL CC indicator is used in place of the DL CC indicator, the UL CC indicator can be set in similar manner.

According to whether the DL CC indicator for requesting the aperiodic CSI is set to 1 or 0 in step 601, the process is branched to step 610 or step 620. If the DL CC indicator is set to 1, this means that the CIF indicates a DL CC and the procedure goes to step 610 and, otherwise, the procedure goes to step 620.

At step 610, the eNB sets the CIF of the UL grant to the index of the DL CC of which the aperiodic CSI is necessary and sets the CSI request field of the UL grant to 1. For example, the CIF is set to 2 for requesting the aperiodic CSI of the DL CC2 201. The CIF is set to 3 for requesting the aperiodic CSI of the DL CC3 202. The CIF is set to 4 for requesting the aperiodic CSI of the DL CC4 203. The CIF is set to 5 for requesting the aperiodic CSI of the DL CC5 204. The CIF setting method follows the rule specified between the eNB and the UE.

The field for indicating the DL CC, i.e., CIF assigned 3 bits for indicating the DL CC according to the first method using a predefined rule, can discriminate among eight states such that, when there are 5 DL CCs, as shown in FIG. 2, five states can be used for indicating individual DL CCs and one state for instructing feedback of CSIs of all the DL CCs. If the field defined for indicating the DL CC indicates a plurality of DL CC, this means that the eNB requests for the aperiodic CSIs of the plural DL CCs.

According to the second method using a predefined rule for setting the CIF indicating the DL CC, the field for indicating the DL CC, i.e. CIF assigned 3 bits for indicating the DL CC, can discriminate among eight states such that three states can be used for indicating individual DL CCs, another three states can be used for indicating three possible pairs among the DL CCs, and one state can be used for indicating all of the three DL CCs. Each bit for indicating each DL CC can be assigned to indicate whether the CSI of a certain DL CC is requested.

The present rule can be informed by RRC signaling or another method.

Referring again to FIG. 6, after setting the CIF, the eNB transmits the UL grant on the DL CC selected among the DL CCs linked to the UL CC, in step 611. In FIG. 2, the eNB transmits the UL grant to the UE on the DL CC1 200. Both the UL grant and DL assignment can be transmitted, and the DL CC linked to the UL CC can be selected for transmitting the UL grant. Since the CIF is used for indicating the DL CC of which aperiodic CSI is requested, the DL CC for transmitting the UL grant containing the CIF can be selected based on the aforementioned condition.

The UE performs blind decoding on the DL CC to receive the UL grant, in step 612. The UE checks that the CSI request field of the UL grant is set to 1. The UE can recognize that the received UL grant is the signal requesting for the CSI. The UE extracts the DL CC indicator from the received UL grant. Since the DL CC indicator of the UL grant is set to 1, the UE can identify the DL CC of which aperiodic CSI is requested from the CIF of the received UL grant. If the DL CC indicator of the UL grant is set to 0, a process, as in step 622, is performed. This process is described in greater detail below.

After receiving the UL grant, the UE measures the CSI of the DL CC indicated by the UL grant, in step 613. The DL CC of which CSI is requested can be identified using the CIF as described above.

The UE transmits the aperiodic CSI on the UL CC linked to the DL CC on which the UL grant is transmitted, or the UL CC selected among the UL CCs linked to the DL CC according to the predefined rule, in step 614. Here, the predefined rule can be as follows:

If the DL CC is linked to a plurality of UL CCs having different bandwidths, the UE can determine the UL CC for transmitting the aperiodic CSI based on the length of the UL grant. If the DL CC is linked to a plurality of UL CCs having the same bandwidth, the UE can determine the UL CC for transmitting the aperiodic CSI by RRC signaling or another method. The other method is to transmit the aperiodic CSI on the UL anchor CC when the DL CC is linked to multiple UL CCs.

Returning to step 601, if the DL CC indicator is set to 0, this means that the CIF indicates a UL CC. When the CIF indicates a UL CC, the DL CC of which aperiodic CSI is necessary should be linked to the UL CC. If the DL CC indicator is set to 0, the procedure goes to step 620.

At step 620, the eNB sets the CIF of the UL grant to the index of the UL CC on which the UE transmits PUSCH and sets the CSI of the UL grant to 1. The eNB transmits the UL grant to the UE through the DL CC of which aperiodic CSI is requested, in step 621. In FIG. 2, the eNB can transmit the UL grant to the UE on the DL CC1 200 for receiving the aperiodic CSI of the DL CC1 200. Only the DL CC1 200 is linked to the UL CCs.

The UE performs blind decoding on the DL CC to receive the UL grant, in step 622. The UE checks that the CSI request field of the UL grant is set to 1. By checking the CSI request field set of the UL grant that is set to 1, the UE can identify that the received UL grant of requesting CSI. The UE extracts the DL CC indicator of the UL grant. The UE can check that the DL CC indicator is set to 0. Accordingly, the UE can identify the UL CC for transmitting PUSCH based on the CIF of the UL grant.

The UE measures the channel state of the DL CC of which aperiodic CSI is requested, in step 623. As described above, the DL CC on which the UL grant is transmitted is the DL CC of which CSI is requested.

The UE transmits the aperiodic CSI through the UL CC which is supposed to transmit PUSCH, i.e. the UL CC indicated by the CIF, in step 624.

In the third embodiment of the present invention described with reference to FIG. 6, an indicator is provided for expressing whether the CIF indicates a DL CC or a UL CC. In this manner, this embodiment of the present invention is capable of requesting and feeding back an aperiodic CSI in the system supporting carrier aggregation unlike the convention LTE system, in which the aperiodic CSI request/feedback is impossible. When a certain DL CC is supported by the conventional LTE standard, the CIF is used to indicate the UL CC for transmitting the CSI, so as to support the aperiodic CSI request/feedback.

Although the description made with reference to FIG. 6 is directed to the case of aperiodic CSI request/feedback of the already activated UL CC, the CSI request/feedback method of the present invent can be applied for aperiodic CSI request/feedback for DL CC in a deactivated state. If there is a DL CC deactivated among the DL CCs 201, 202, 203, and 204 in FIG. 2, the DL CC indicator is set such that the CIF indicates the DL CC according to the procedure of FIG. 6. The eNB requests the aperiodic CSI of the deactivated DL CC, and the UE can transmit the aperiodic CSI of the deactivated DL CC. In this case, however, the RF of the deactivated DL CC can be turned on or off according to whether the deactivated DL CC is contiguous or not in the frequency domain. When the RF of the deactivated DL CC is turned on, step 613 is performed as shown in FIG. 6. However, when the RF of the deactivated DL CC is turned off, it is required to turn on the RF before measuring the channel state of the deactivated DL CC.

Figure 7:
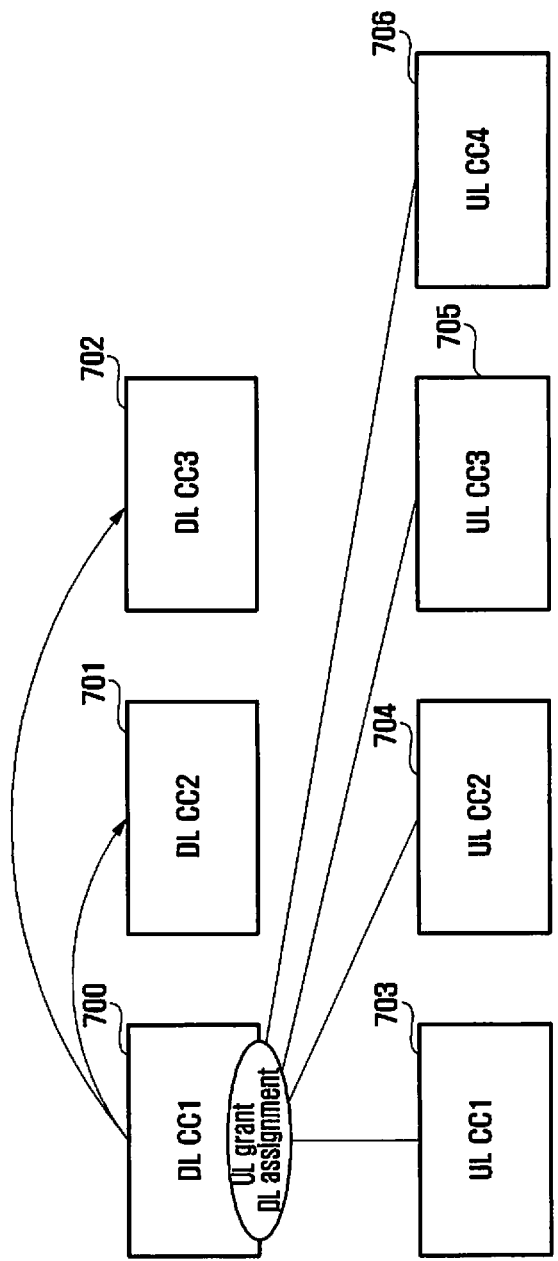
FIG. 7 is a diagram illustrating a linkage relationship between DL CCs and UL CCs in the CSI request/feedback method, according to a fourth embodiment of the present invention.

FIG. 7 is a diagram illustrating a linkage relationship between DL CCs and UL CCs in the CSI request/feedback method, according to the fourth embodiment of the present invention. In the fourth embodiment of the present invention, the cross carrier scheduling is supported. Specifically, both the UL grant and DL assignment include a CIF. A description is provided below of the linkage relationship in detail.

Referring to FIG. 7, DL CC1 700 is linked to UL CC1 703, UL CC2 704, UL CC3 705, and UL CC4 706, and the linkage relationship is expressed by a solid line. Both the UL grant and DL assignment can be transmitted on the DL CC1 700. The description below is directed to the case where DL CC2 701 and DL CC3 702 are not linked to any UL CC, and the UL grant and DL assignment of the DL CC2 701 and DL CC3 702 are not transmitted. This means that the DL CC2 701 and DL CC3 702 are used in the PDSCH, i.e. downlink data. The UL control information, i.e. ACK/NACK, for the DL CC2 701 and DL CC3 702 can be transmitted on a UL anchor CC defined by RRC signaling.

Figure 8:
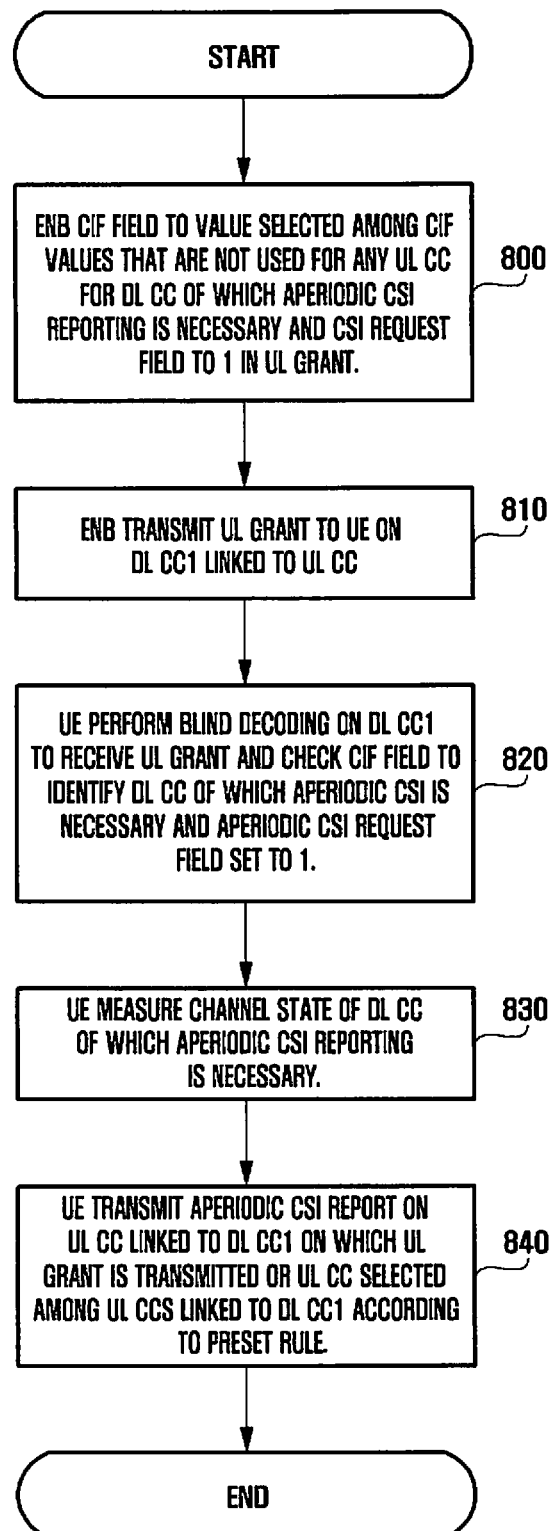
FIG. 8 is a flowchart illustrating an aperiodic CSI request/feedback method, according to the fourth embodiment of the present invention.

FIG. 8 is a flowchart illustrating an aperiodic CSI request/feedback method, according to the fourth embodiment of the present invention.

In the aperiodic CSI request/feedback method according to the fourth embodiment of the present invention, the value that is not used as the UL CC indicator among the CIF values of the UL grant is used for indicating the DL CC of which aperiodic CSI is necessary. Specifically, since the CIF values that can be used as the UL CC identifier are 1, 2, 3, and 4, the rest values of 5, 6, 7, and 8 are used for indicating the DL CC2 and DL CC3. In the above example, the CIF value of 5 can be used for indicating the DL CC2 701 and the CIF value of 6 for indicating the DL CC3 702. When the CIF of the UL grant transmitted by the eNB is set to a value indicating a DL CC, the UE receives the UL grant and checks that the CSI request field of the UL grant is set to 1 and thus, the CIF of the UL grant is set to 5 or 6. The CIF value of 5 or 6 can be negotiated to be used as a DL CC indicator between the eNB and UE. Accordingly, the UE can recognize that the CIF of the UL grant which has the value of 5 or 6 is not used as the indicator of the UL CC for transmitting PUSCH but as the indicator of the DL CC of which aperiodic CSI is requested.

Referring to FIG. 8, the eNB first sets the CSI request field of the UL grant to 1, in step 800. At step 800, the eNB also sets the CIF of the UL grant to a CIF value assigned as the indicator of the DL CC of which aperiodic CSI is necessary. The CIF value assigned as an indicator of DL CC can be a value predefined among CIF values that are not assigned as indicators of UL CCs. For example, the eNB can assign the value of 5 as the indicator of the DL CC2 and the valued of 6 as the indicator of the DL CC3 and notify the UE of DL CC indicator values by RRC signaling or other method. In FIG. 7, the eNB can set the CIF to 5 to request for the aperiodic CSI of the DL CC2 701, or can set the CIF to 6 to request the aperiodic CSI of the DL CC3 702.

As in the first and third embodiments of the present invention, it is possible to request the CSI of plural DL CCs with one of the CIF states. In the fourth embodiment of the present invention, however, the number of CIF states may be shortened such that the combined CSI request for multiple DL CCs is limited to some extent.

Next, the eNB transmits the UL grant to the UE on the DL CC1 700 linked to the UL CC, in step 810. Both the UL grant and DL assignment can be transmitted, and the DL CC linked to the UL CC is selected for transmitting the UL grant. Since the CIF is used to indicate the DL CC of which aperiodic CSI is necessary, the DL CC for transmitting the UL grant containing the CIF can be selected according to the aforementioned conditions.

Meanwhile, the UE performs blind decoding on the DL CC1 700 to receive the UL grant, in step 820. At step 820, the UE analyzes the CSI request field of the UL grant so as to identify the received UL grant as a CSI request signal. The UE analyzes the CIF. Since the CIF is set to 5 or 6, the UE regards the CIF value as the indicator of the DL CC of which aperiodic CSI is requested. Accordingly, the UE can identify the DL CC of which aperiodic CSI is requested, based on the CIF value.

Next, the UE measures the channel quality of the DL CC of which aperiodic CSI is requested, in step 830. Specifically, the UE measures the channel quality of the DL CC indicated by the CIF of the UL grant.

Finally, the UE transmits the aperiodic CSI on UL CC linked to the DL CC1 700 on which the UL grant is transmitted or the UL CC selected according to the reset rule among the UL CCs linked to the DL CC1 700, in step 840. The predefined rule is as follows:

If the DL CC is linked to a plurality of UL CCs having different bandwidths, the UE can determine the UL CC for transmitting the aperiodic CSI based on the length of the UL grant. If the DL CC is linked to a plurality of UL CCs having the same bandwidth, the UE can determine the UL CC for transmitting the aperiodic CSI by RRC signaling or another method. The other method is to transmit the aperiodic CSI on the UL anchor CC when the DL CC is linked to multiple UL CCs.

When the eNB requests the aperiodic CSIs of two or more DL CCs, it can be considered to perform joint coding on the CSI about more than two DL CCs rather than encode the aperiodic CSIs of DL CCs individually in another embodiment of the present invention. When the aperiodic CSIs of more than two DL CCs are greater than 11 bits, TBCC or Turbo Code can be used. When the aperiodic CSIs of the DL CCs are less than or equal to the 11 bits, (32, x) block code can be used, where x means information size.

Although the aperiodic CSI request/feedback method described with reference to FIGS. 7 and 8 have been directed to the case of requesting the aperiodic CSI of the already activated DL CC, it can be applied to the case of requesting aperiodic CSI of a deactivated DL CC. If there is a deactivated DL CC among the DL CCs 701 and 702 in FIG. 7, the eNB can request the UE for the aperiodic CSI of the deactivated DL CC, and thus, the UE transmits the aperiodic CSI of the deactivated DL CC. In this case, however, the RF of the deactivated DL CC can be turned on or off according to whether the deactivated DL CC is contiguous in the frequency domain. When the RF of the deactivated DL CC is turned on, step 830 is performed as shown in FIG. 6, but when the RF of the deactivated DL CC is turned off, it is required to turn on the RF before measuring the channel state of the deactivated DL CC.

Figure 9:
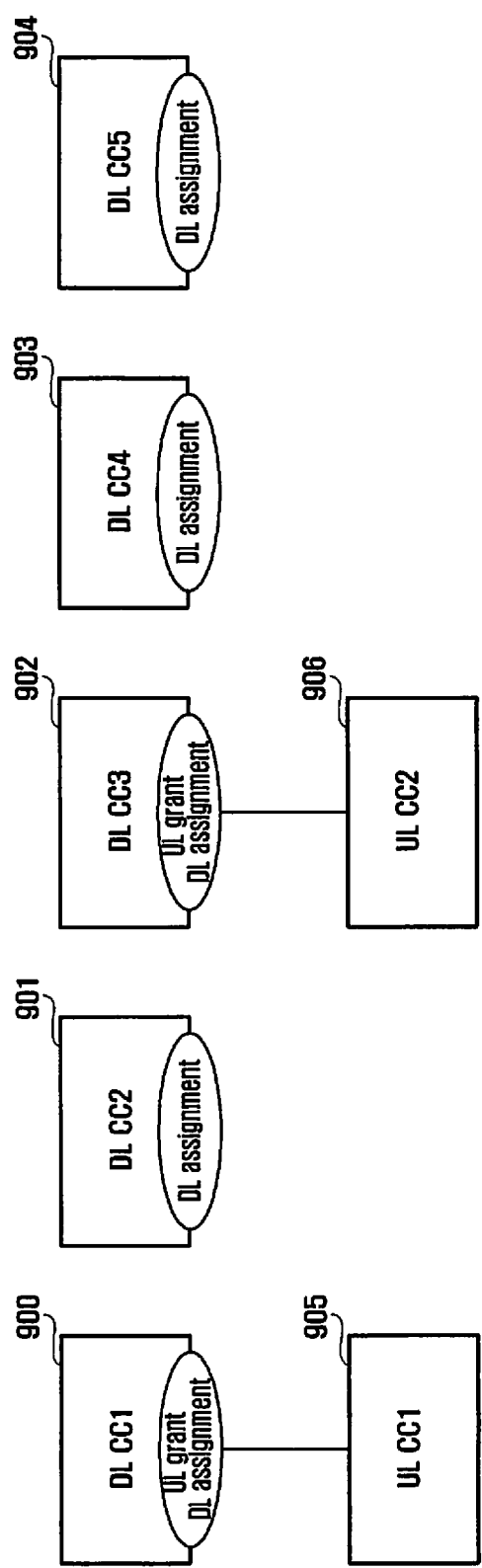
FIG. 9 is a diagram illustrating a linkage relationship between DL CCs and UL CCs in the CSI request/feedback method, according to a fifth embodiment of the present invention.

FIG. 9 is a diagram illustrating a linkage relationship between DL CCs and UL CCs in the CSI request/feedback method, according to the fifth embodiment of the present invention.

In the fifth embodiment of the present invention, the cross carrier scheduling is not supported. Specifically, the UL grant and DL assignment carry no CIF. Referring to FIG. 9, DL CC1 900 is linked to UL CC1 905, and DL CC3 902 is linked to the UL CC2 906. The linkage relationships are expressed by solid lines in FIG. 9. The DL CC1 900 and DL CC3 902 can be used for transmitting the UL grant and DL assignment. Meanwhile, DL CC2 901, DL CC4 903, and DL CC5 904 are not linked to any UL CC, and it is assumed that only the DL assignment transmission is allowed. The UL control information, i.e. ACK/NACK, for the DL CCs 901, 903, and 904 that are not supporting transmission of UL grant, can be transmitted on the UL anchor CC defined by RRC signaling. The linkage relationship depicted in FIG. 9 is a carrier arrangement available for case where there is a large amount of data to be transmitted in downlink.

Figure 10:
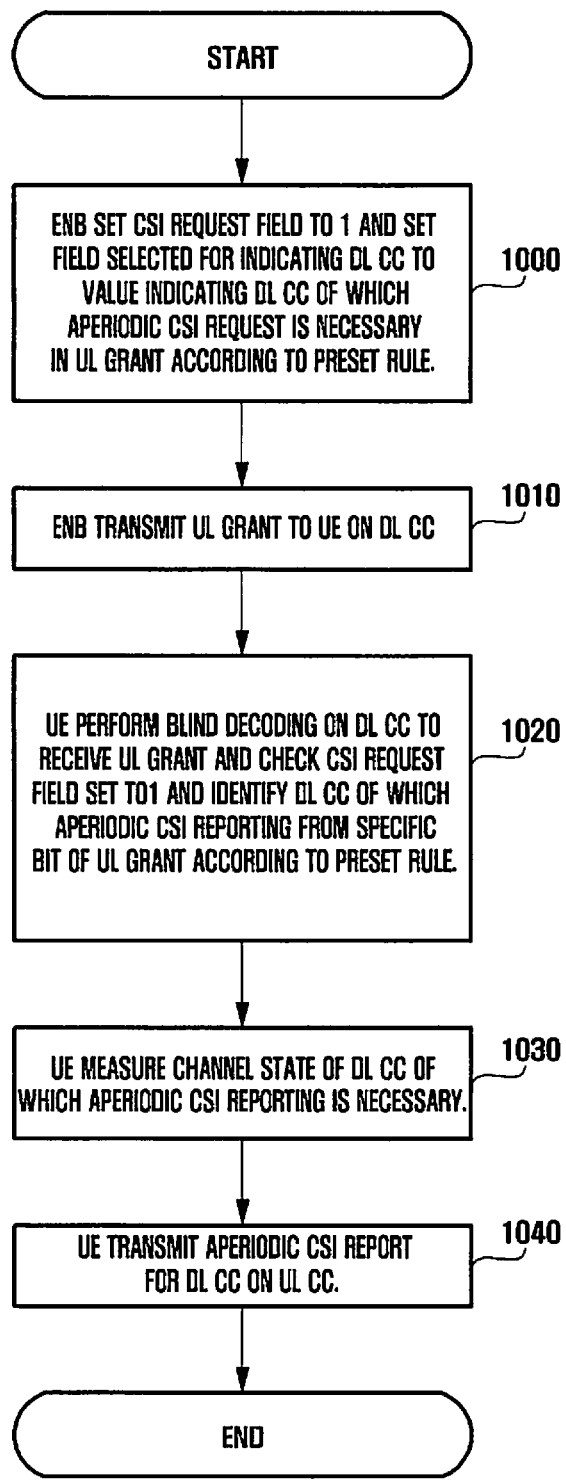
FIG. 10 is a flowchart illustrating an aperiodic CSI request/feedback method, according to the fifth embodiment of the present invention.

FIG. 10 is a flowchart illustrating an aperiodic CSI request/feedback method, according to the fifth embodiment of the present invention.

In the aperiodic CSI request/feedback method according to the fifth embodiment of the present invention, 3 bits for indicating the DL CC can be added to the UL grant or, when the CSI request is set to 1, at least one field currently reserved for another purpose in the UL grant can be used for indicating DL CC. The new 3 bits can be added by newly defining the UL grant for UL transmission, and the at least one field reserved for other purpose includes 3-bit cyclic shift for Demodulation Reference Signal (DMRS), 1-bit hoping flag, 1-bit New Data Indicator (NDI), and 2-bit Transmission Power Control (TPC) command. In the LTE Release 8 specification, if the CSI request field is set to 1 with Modulation and Coding Scheme (MCS) level of 29 and the Physical Resource Blocks (PRBs) of which number equal to or less than 4, no transport block is transmitted. Accordingly, it can be possible to use bit fields for indicating the DL CC of which aperiodic CSI is necessary.

In the following, the description is made of the aperiodic channel request/feedback procedure under the assumption that there is a bit field negotiated for use in indicating DL CC according to the aforementioned method.

The aperiodic channel request/feedback procedure depicted in FIG. 10 can be applied to the system implemented with the component carrier configuration as depicted in FIG. 2 as well as FIG. 9. The detailed description is provided below.

The eNB first sets the CSI request field of the UL grant to 1 and sets a field selected for indicating the DL CC in the UL grant to a value indicating the DL CC of which aperiodic CSI is necessary according to a predefined rule in step 1000.

In the first method for setting the field indicating the DL CC based on a predefined rule, if 3 bits are assigned for indicating DL CC, it is possible to discriminate among eight states with the 3 bits such that, when there are 5 DL CCs as shown in FIGS. 2 and 9, five states can be used for indicating individual DL CCs and one state for instructing feedback of CSIs of all the DL CCs. If the field defined for indicating the DL CC indicates a plurality of DL CCs, this means that the eNB requests the aperiodic CSIs of the plural DL CCs.

In the second method for setting the field indicating the DL CC based on a predefined rule, if 3 bits are assigned for indicating DL CC, it is possible to discriminate among eight states with the 3 bits such that, when there are 3 DL CCs as shown in FIG. 4, three states can be used for indicating individual DL CCs, another three states can be used for indicating three possible pairs among the DL CCs, and one state can be used for indicating all of the three DL CCs. For example, each bit for indicating each DL CC can be assigned to indicate whether the CSI of a certain DL CC is requested.

The predefined rule can be informed by RRC signaling or another method.

If there exists the CIF as in the embodiment described in FIG. 2, the eNB uses the CIF as an identifier of the UL CC for transmission of PUSCH.

Referring again to FIG. 10, the eNB transmits the UL grant to the UE on the DL CC, in step 1010. If there is the CIF as in the case of FIG. 2, the eNB transmits the UL grant on the DL CC linked to the UL CC identified by the CIF. Otherwise, if no CIF exist as in the case of FIG. 9, it is possible to transmit the UL grant and DL assignment. The UL grant is transmitted on the DL CCs linked to the UL CC, i.e., the DL CC1 900 or DL CC3 902.

The UE performs blind decoding on the DL CC to receive the UL grant and checks that the CSI request field is set to 1, in step 1020. At step 1020, the UE also identifies the DL CC of which aperiodic CSI is requested based on specific bits of the UL grant that are negotiated for indicating the DL CC according to the predefined rule. The predefined rule is the predefined rule described at step 1000 and transmitted from the eNB to the UE by RRC signaling or other method.

The UE measures the channel quality of the DL CC of which aperiodic CSI is necessary, in step 1030. The DL CC of which aperiodic CSI is necessary is the one identified by analyzing the field negotiated for indicating the DL CC at step 1020.

The UE transmits the aperiodic CSI of the DL CC through the UL CC, in step 1040. If there is the CIF as in the case of FIG. 2 at step 1030, the UE transmits the aperiodic CSI of the DL CC on the UL CC identified by the CIF. Otherwise, if there is no CIF as in the case of FIG. 9, the UE transmits the aperiodic CSI of the DL CC through the UL CC linked to the DL CC on which the UL grant is received or a UL anchor CC.

When the eNB requests the aperiodic CSIs of two or more DL CCs, it can be considered to perform joint coding on the CSI about more than two DL CCs rather than encode the aperiodic CSIs of DL CCs individually in another embodiment of the present invention. When the aperiodic CSIs of more than two DL CCs are greater than 11 bits, TBCC or Turbo Code can be used. When the aperiodic CSIs of the DL CCs are equal to or less than the 11 bits, (32, x) block code can be used, where x means information size.

Although the aperiodic CSI request/feedback method described with reference to FIG. 10 has been directed to the case of requesting the aperiodic CSI of the already activated DL CC, it can be applied to the case of requesting aperiodic CSI of a deactivated DL CC. If there is a deactivated DL CC among the DL CCs in FIG. 2 or 9, the eNB can request the UE for the aperiodic CSI of the deactivated DL CC as described with reference to FIG. 10, and thus, the UE can transmit the aperiodic CSI of the deactivated DL CC. In this case, however, the RF of the deactivated DL CC can be turned on or off according to whether the deactivated DL CC is contiguous or not in frequency domain. In the state where the RF of the deactivated DL CC is turned on, step 830 is performed as shown in FIG. 8, but when the RF of the deactivated DL CC is turned off, it is required to turn on the RF before measuring the channel state of the deactivated DL CC.

Figure 11:
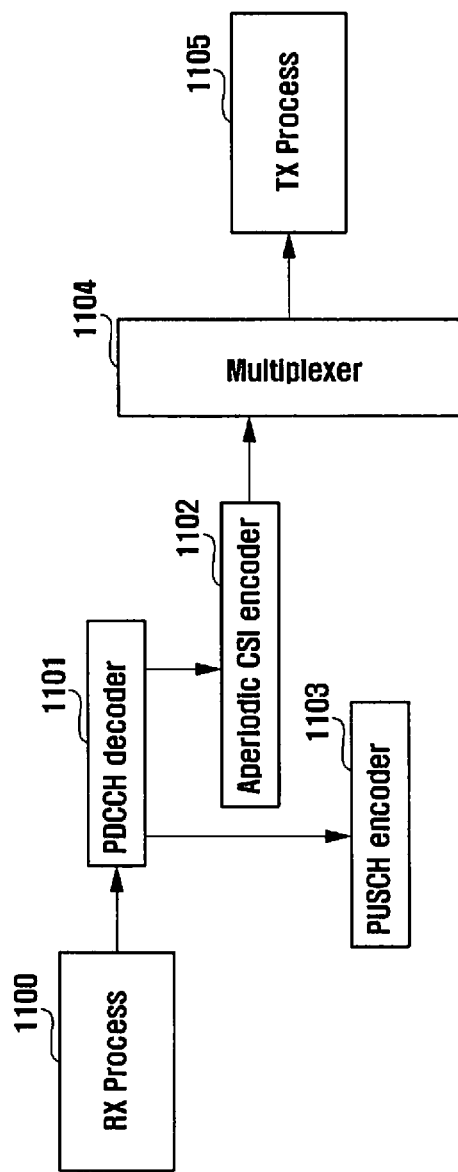
FIG. 11 is a block diagram illustrating a configuration of a UE for supporting the CSI request/feedback method, according to an embodiment of the present invention.

FIG. 11 is a block diagram illustrating a configuration of a UE for supporting the CSI request/feedback method, according to an embodiment of the present invention.

A receiver 1100 receives the UL grant according to one of the embodiments of the present invention and delivers the UL grant to a PDCCH decoder 1101. The PDCCH decoder 1101 decodes and analyzes the UL grant so as to extract the value from the CSI request field or a certain field added to the UL grant, according to an embodiment of the present invention. Based on the field value and other information, it is possible to identify the DL CC of which aperiodic channel is requested and the UL CC for transmitting the aperiodic CSI, according to one of the embodiments of the present invention. An aperiodic CSI decoder 1102 generates the aperiodic CSI of the DL CC, and a PUSCH encoder 1103 generates uplink data information. The DL CC aperiodic CSI generated by the aperiodic CSI decoder 1102 and the uplink data information generated by the PUSCH encoder 1103 is multiplexed by a multiplexer 1104 and then transferred to a transmitter 1105. The transmitter 1105 transmits the multiplexed data to the eNB.

Figure 12:
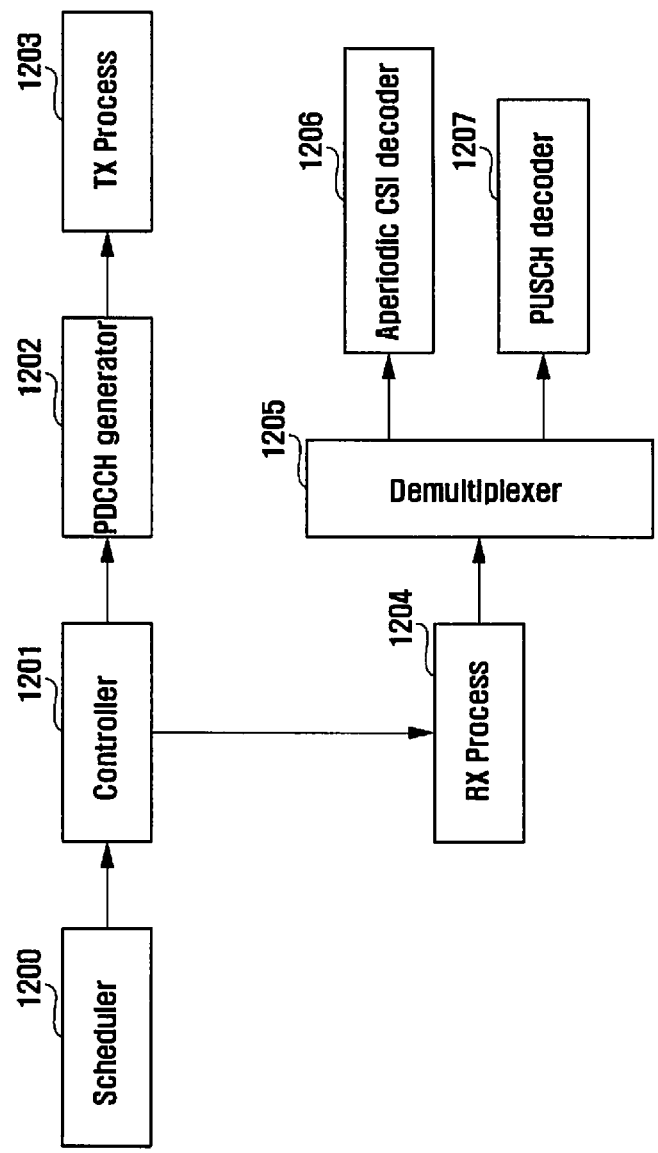
FIG. 12 is a block diagram illustrating a configuration of an eNB for supporting the CSI request/feedback method, according to an embodiment of the present invention.

FIG. 12 is a block diagram illustrating a configuration of an eNB for supporting the CSI request/feedback method, according to an embodiment of the present invention.

A scheduler 1200 and a controller 1201 control a PDCCH generator 1202 to generate the UL grant, according to one of the embodiments of the present invention, and transfer the UL grant to a transmitter 1203. As described above, the UL grant includes the indicator indicating a request for aperiodic CSI. The transmitter 1203 transmits the UL grant provided by the PDCCH generator 1202 to the UE. The scheduler 1200 and controller 1201 also control a receiver 1204 to receive the uplink information, according to one of the embodiments of the present invention, and to transfer the uplink information to a demultiplexer 1205. The demultiplexer 1205 demultiplexes the uplink information into uplink data information and aperiodic CSI, and transfers the aperiodic CSI to an aperiodic CSI decoder 1206, and transfers the uplink data information to a PUSCH decoder 1207. The aperiodic CSI decoder 1206 decodes the aperiodic CSI, and the PUSCH decoder 1207 decodes the uplink data information.

Figure 13:
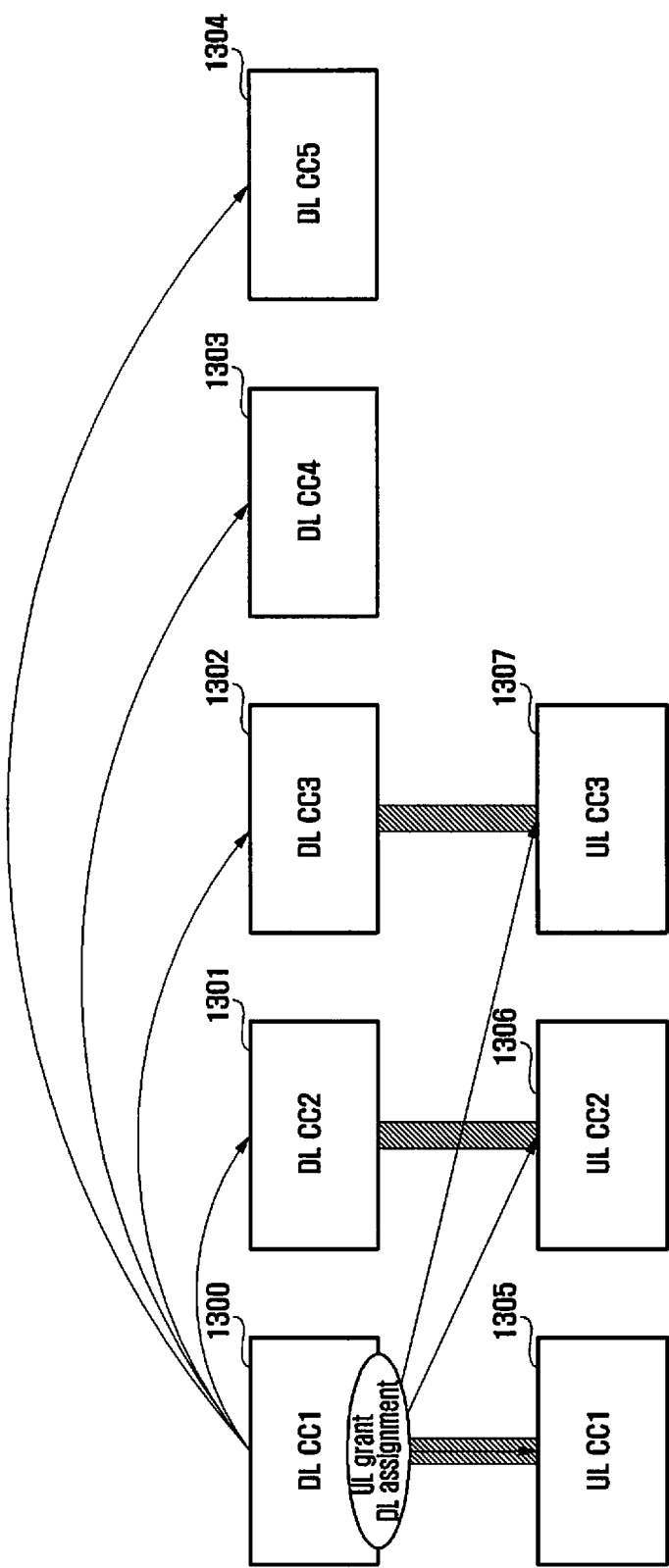
FIG. 13 is a diagram illustrating a linkage relationship between DL CCs and UL CCs in the CSI request/feedback method, according to a sixth embodiment of the present invention.

FIG. 13 is a diagram illustrating a linkage relationship between DL CCs 1300, 1301, 1302, 1303, and 1304 and UL CCs 1304, 1306, and 1307 in the CSI request/feedback method, according to the sixth embodiment of the present invention.

In the sixth embodiment of the present invention, the cross carrier scheduling is supported. Specifically, the UL grant and DL assignment include a CIF.

Referring to FIG. 13, the DL CC and UL CC of each pair of DL CC1 1300 and UL CC1 1305, DL CC2 1301 and UL CC2 1306, and DL CC3 1302 and UL CC3 1307 are linked via an SIB link. DL CC4 1303 and DL CC5 1304 are not linked to any UL CC. The SIB link is expressed by a shadow line to indicate the systematic linkage between the DL CCs and UL CCs by the system information. Since the cross scheduling is allowed, it is noted that the scheduling for the UL CC may not occur on the DL CC linked via SIB link. Although the description is made under the assumption that the DL CC4 1303 and DL CC5 1304 are not linked to any UL CC via an SIB link, an embodiment where the DL CC is associated with a UL CC through an SIB link is described separately. In FIG. 13, the scheduling relationship is expressed by a solid line arrow. While the solid line used for expressing the linkage relationship between a DL CC and a UL CC in FIGS. 2 and 7 means the relationship between the DL CC for transmitting the UL grant and the UL CC for transmitting the PUSCH scheduled by the UL grant, the solid line arrow is used to express the same relationship in this embodiment. The DL CC1 1300 can be used to transmit both the UL grant and DL assignment, while other DL CCs 1301, 1302, 1303, and 1304 are not used to transmit UL grant and DL assignment. This means that the DL CCs 1301, 1302, 1303, and 1304 are used for transmitting only the PDSCH, i.e. downlink data. The UL control information, i.e. ACK/NACK, for the DL CCs 1301, 1302, 1303, and 1304 can be transmitted on the UL anchor CC defined by RRC signaling.

The CSI request procedure in which an eNB requests a UE for the aperiodic CSI of one of the DL CCs 1301, 1302, 1303, and 1304 and the CSI feedback procedure in which the UE measures and feeds back the CSI to the eNB are described with reference to FIGS. 14 and 15, respectively, under the assumption of the linkage relationship between the DL CCs and UL CCs depicted in FIG. 13.

A description is made of the procedure for requesting for aperiodic CSI a certain DL CC according to the sixth embodiment hereinafter. The DL CC of which aperiodic CSI is requested with the CIF request field set to 1 is configured as the DL CC linked to the UL CC indicated by the CIF field via SIB link. This is described in more detail with reference to FIGS. 14 and 15.

Figure 14:
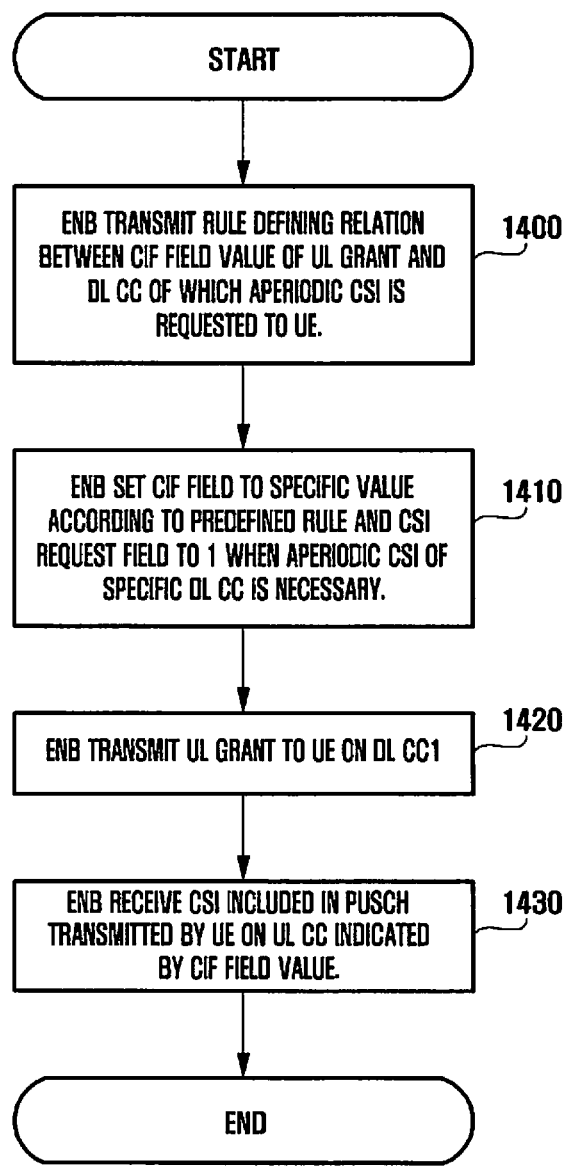
FIG. 14 is a flowchart illustrating an aperiodic CSI request method of an eNB, according to the sixth embodiment of the present invention.

FIG. 14 is a flowchart illustrating an aperiodic CSI request method of an eNB, according to the sixth embodiment of the present invention.

The eNB first transmits a rule predefining the relationship for determining the CIF field value of the UL grant and the DL CC of which aperiodic CSI is requested to the UE, in step 1400. According to the predefined rule, the CIF value for requesting for the aperiodic CSI of the DL CCs that has no SIB link with any UL CC in FIG. 13 can be determined. Since it is assumed that the DL CC4 1303 and the DL CC5 1304 have no SIB link with any UL CC in FIG. 13, when the CIF of the UL grant is set to a value indicating the UL CC1 1305, the aperiodic CSI of the DL CC4 1303 can be transmitted in addition to the DL CC1 1300 which is SIB-linked with the UL CC1 1305. When the CIF of the UL grant is set to a value indicating the UL CC2 1306, the aperiodic CSI of the DL CC5 1304 can be transmitted in addition to the DL CC2 1301 which is SIB linked with the UL CC2 1306. Also, when the CIF of the UL grant is set to a value indicating the UL CC3 1307, it is possible to transmit the aperiodic CSIs of the DL CC4 1303 and DL CC5 1304 in addition to the DL CC3 1302 which is SIB-linked to the UL CC3 1307. Although the description has been made under the assumption that the DL CC4 1303 and the DL CC5 1304 are not SIB-linked with any UL CC, if the DL CC4 1303 and the DL CC5 1304 are SIB-linked with any UL CC, e.g. the UL CC3 1307 is SIB-linked with DL CC3 1302, DL CC4 1303, and DL CC5 1304, it is not necessary to transmit the predefined rule to the UE. When it is necessary to provide the predefined rule to the UE, the predefined rule can be informed by higher layer signaling such as RRC signaling or can be transmitted in system information.

When the aperiodic CSI of a specific DL CC is necessary, the eNB sets the CIF of the UL grant to a certain value and sets the CSI request field to 1, according to the predefined rule, in step 1410. In the configuration of FIG. 13, the eNB sets the CIF to 2 for the aperiodic CSI of the DL CC2 1301, sets the CIF to 3 for the aperiodic CSI of the DL CC3 1302, a value selected according to the predefined rule for the aperiodic CSI of the DL CC4 1303, and sets the CIF to another value selected according to the predefined rule for the aperiodic CSI of the DL CC5 1304.

The eNB transmits the UL grant to the UE on the DL CC1 1300, in step 1420. At step 1420, the eNB also selects the DL CC available for transmitting the UL grant for the UL CC, which is SIB-linked to the DL CC of which aperiodic CSI is necessary. Since the aperiodic CSI of the DL CC that is SIB-linked to the UL CC indicated by the CIF is transmitted, the DL CC on which the UL grant including the CIF is transmitted can be selected according to the aforementioned conditions.

Finally, the eNB receives the aperiodic CSI included in the PUSCH, which the UE has transmitted on the UL CC indicated by the CIF field value, in step 1430.

Figure 15:
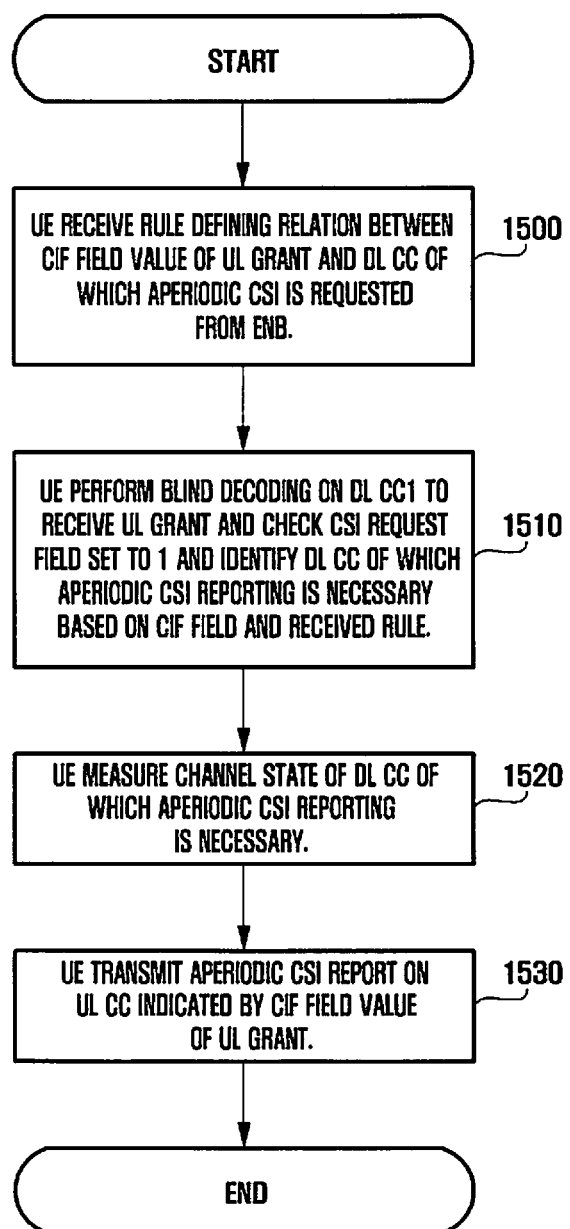
FIG. 15 is a flowchart illustrating an aperiodic CSI feedback method of the UE, according to the sixth embodiment of the present invention.

FIG. 15 is a flowchart illustrating an aperiodic CSI feedback method of the UE, according to the sixth embodiment of the present invention.

The UE first receives the rule predefining the relationship for determining CIF field value of the UL grant and the DL CC of which aperiodic CSI is requested for the eNB, in step 1500.

The predefined rule is identical with that transmitted by the eNB at step 1400 of FIG. 14 and, when all of the DL CCs are SIB-linked to an UL CC, it is not necessary for the eNB to transmit the predefined rule to the UE.

The UE performs blind decoding on the DL CC1 1300 to receive the UL grant and checks the CSI request field of the received UL grant which is set to 1, in step 1510. The UE identifies the DL CC of which aperiodic CSI is requested based on the CIF field of the received UL grant and the predefined rule.

The UE measures the channel quality of the DL CC of which aperiodic CSI is requested, in step 1520. Measuring the CSI of the DL CC can include the operation of extracting the information for transmitting the CSI that is measured and stored already. This can be applied in other embodiments.

The UE transmits the aperiodic CSI on the UL CC indicated by the CIF field value of the UL grant, in step 1530.

When the eNB requests for the aperiodic CSIs of two or more DL CCs, it can be considered to encode the aperiodic CSIs of more than two DL CCs individually and then multiplex the coded aperiodic CSIs. When the aperiodic CSIs of more than two DL CCs are greater than 11 bits, TBCC or Turbo Code can be used. When the aperiodic CSIs of the DL CCs are equal to or less than the 11 bits, (32, x) block code can be used, where x means information size.

Although the aperiodic CSI request/feedback method according to the sixth embodiment has been directed to the case of requesting the aperiodic CSI of the already activated DL CC, it can be applied to the case of requesting aperiodic CSI of a deactivated DL CC. If there is a deactivated DL CC among the DL CCs 201, 202, 203, and 204 in FIG. 2, the eNB can request the UE for the aperiodic CSI of the deactivated DL CC according to the procedure of FIG. 14, and the UE transmits the aperiodic CSI of the deactivated DL CC according to the procedure of FIG. 15. In this case, however, the RF of the deactivated DL CC can be turned on or off according to whether the deactivated DL CC is contiguous in the frequency domain. In the state where the RF of the deactivated DL CC is turned on, the procedure is performed as shown in FIG. 6, but when the RF of the deactivated DL CC is turned off, it is required to turn on the RF before measuring the channel state of the deactivated DL CC.

Although the descriptions have been directed to the case where the eNB requests the CSI with UL grant, the eNB can request the UE for the CSI with a message equivalent to the uplink grant.

As described above, the CSI request/feedback method and apparatus of the present invention enables the eNB to request aperiodic CSI of a DL CC and the UE to measure and feed back the aperiodic CSI of the DL CC through the UL CC in the wireless communication system adopting the bandwidth extension technique.

It should be appreciated that the steps of the flowchart and their combinations can be implemented in the form of computer-readable program instructions. The computer program instructions may also be loaded onto a universal computer, a special-purpose computer, or other programmable data processing apparatus to cause a series of operational steps to be performed on the computer or other programmable apparatus to produce a computer-implemented process. The instructions that execute on the computer or other programmable apparatus provide steps for implementing the functions specified in the flowchart block or blocks. Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems that perform the specified functions or acts, or combinations of special purpose hardware and computer instructions.

The term "module" according to the embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

Although embodiments of the present invention have been described in detail with specific terminology, this is for the purpose of describing particular embodiments only and not intended to be limiting of the invention. While the invention has been shown and described with reference to certain embodiments thereof, it will be understood by those skilled in the art that various other changes in form and detail may be made therein without departing from the spirit and scope of the invention as defined by the appended claims.

What is claimed is:

1. A method for Channel State Information (CSI) request of a base station in a communication system using a plurality of Downlink (DL) Component Carriers (CC)s, comprising:
configuring CSI information for a terminal through Radio Resource Control (RRC) signaling, the CSI information including multiple bits and a first value of the multiple bits indicates a first set of one or more DL CCs and a second value of the multiple bits indicates a second set of one or more DL CCs;
transmitting, in PDCCH on a DL CC to the terminal, an UpLink (UL) grant including a request for aperiodic CSI, where the request for the aperiodic CSI is associated with one of at least the first value of the multiple bits and the second value of the multiple bits included in the CSI information; and
receiving, in PUSCH on a UL CC from the terminal, at least one aperiodic CSI corresponding to the first set of DL CCs or the second set of DL CCs according to the one of at least the first value of the multiple bits and the second value of the multiple bits,
wherein the UL grant is associated with grant of the PUSCH on the UL CC,
wherein the UL CC is linked with the DL CC, and
wherein linking between the UL CC and the DL CC is defined based on system information.

2. The method of claim 1, wherein the CSI information is further configured to include a configuration of the DL CC for the terminal.

3. The method of claim 1, wherein the CSI information is further defined through System Information Block (SIB) signaling.

4. The method of claim 1, wherein the at least one aperiodic CSI is not triggered, if the request for aperiodic CSI is not mapped to the aperiodic CSI.

5. A method for Channel State Information (CSI) feedback of a terminal in a communication system using a plurality of DownLink (DL) Component Carriers (CCs), comprising:
- identifying CSI information through Radio Resource Control (RRC) signaling from a base station, the CSI information including multiple bits, and a first value of the multiple bits indicates a first set of one or more DL CCs and a second value of the multiple bits indicates a second set of one or more DL CCs;
- receiving, in PDCCH on a DL CC, an UpLink (UL) grant including a request for aperiodic CSI, where the request for the aperiodic CSI is associated with one of at least the first value of the multiple bits and the second value of the multiple bits included in the CSI information; and
- transmitting, in PUSCH on a UL CC to the base station, at least one aperiodic CSI corresponding to the first set of DL CCs or the second set of DL CCs according to the one of at least the first value of the multiple bits and the second value of the multiple bits,
- wherein the UL grant is associated with grant of the PUSCH on the UL CC,
- wherein the UL CC is linked with the DL CC, and
- wherein linking between the UL CC and the DL CC is defined based on system information.

6. The method of claim 5, wherein the CSI information further includes a configuration of the DL CC for the terminal.

7. The method of claim 5, wherein the CSI information is further defined through System Information Block (SIB) signaling.

8. The method of claim 5, wherein the at least one aperiodic CSI is not triggered, if the request for aperiodic CSI is not mapped to the aperiodic CSI.

9. A base station for transmitting a Channel State Information (CSI) request in a communication system using a plurality of DownLink (DL) Component Carriers (CCs), comprising:
- a controller for configuring CSI information for a terminal through Radio Resource Control (RRC) signaling, the CSI information including multiple bits, and a first value of the multiple bits indicates a first set of one or more DL CCs and a second value of the multiple bits indicates a second set of one or more DL CCs;
- a transmitter for transmitting, on a DL CC to the terminal, an UpLink (UL) grant including a request for aperiodic CSI where the request for the aperiodic CSI is associated with one of at least the first value of the multiple bits and the second value of the multiple bits included in the CSI information; and
- a receiver for receiving, in PUSCH on a UL CC from the terminal, at least one aperiodic CSI corresponding to the first set of DL CCs or the second set of DL CCs according to the one of at least the first value of the multiple bits and the second value of the multiple bits,
- wherein the UL grant is associated with grant of the PUSCH on the UL CC,
- wherein the UL CC is linked with the DL CC, and
- wherein linking between the UL CC and the DL CC is defined based on system information.

10. The base station of claim 9, wherein the CSI information further includes a configuration of the DL CC for the terminal.

11. The base station of claim 10, wherein the CSI information is further defined through System Information Block (SIB) signaling.

12. The base station of claim 9, wherein the at least one aperiodic CSI is not triggered, if the request for aperiodic CSI is not mapped to an aperiodic CSI.

13. A terminal for transmitting Channel State Information (CSI) feedback in a communication system using a plurality of Downlink (DL) Component Carriers (CCs), comprising:
- a controller for identifying CSI information through Radio Resource Control (RRC) signaling from a base station, the CSI information including multiple bits, and a first value of the multiple bits indicates a first set of one or more DL CCs and a second value of the multiple bits indicates a second set of one or more DL CCs;
- a receiver for receiving, on a DL CC, an UpLink (UL) grant including a request for aperiodic CSI in PDCCH on a DL CC, where the request for the aperiodic CSI is associated with one of at least the first value of the multiple bits and the second value of the multiple bits included in the CSI information; and
- a transmitter transmitting, in PUSCH on a UL CC to the base station, at least one aperiodic CSI corresponding to the first set of DL CCs or the second set of DL CCs according to the one of at least the first value of the multiple bits and the second value of the multiple bits,
- wherein the UL grant is associated with grant of the PUSCH on the UL CC,
- wherein the UL CC is linked with the DL CC, and
- wherein linking between the UL CC and the DL CC is defined based on system information.

14. The terminal of claim 13, wherein the CSI information further includes a configuration of the DL CC for the terminal.

15. The terminal of claim 13, wherein the CSI information is further defined through System Information Block (SIB) signaling.

16. The terminal of claim 13, wherein the at least one aperiodic CSI is not triggered, if the request for aperiodic CSI is not mapped to the aperiodic CSI.

* * * * *